(12) United States Patent
Durham et al.

(10) Patent No.: US 11,641,272 B2
(45) Date of Patent: May 2, 2023

(54) SEAMLESS ONE-WAY ACCESS TO PROTECTED MEMORY USING ACCESSOR KEY IDENTIFIER

(71) Applicant: Intel Corporation, Santa Clara, CA (US)

(72) Inventors: David M. Durham, Beaverton, OR (US); Siddhartha Chhabra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 16/948,460

(22) Filed: Sep. 18, 2020

(65) Prior Publication Data

US 2021/0006395 A1 Jan. 7, 2021

(51) Int. Cl.
*H04L 9/08* (2006.01)
*G06F 9/455* (2018.01)
*G06F 12/0882* (2016.01)

(52) U.S. Cl.
CPC ........ *H04L 9/0825* (2013.01); *G06F 9/45558* (2013.01); *G06F 12/0882* (2013.01); *H04L 9/0861* (2013.01); *G06F 2009/45587* (2013.01); *G06F 2009/45591* (2013.01); *G06F 2009/45595* (2013.01); *G06F 2212/7201* (2013.01)

(58) Field of Classification Search
CPC ....... H04L 9/0825; H04L 9/0861; H04L 9/14; H04L 9/0894; G06F 9/45558; G06F 12/0882; G06F 2009/45587; G06F 2009/45591; G06F 2009/45595; G06F 2212/7201; G06F 21/602; G06F 21/64
See application file for complete search history.

(56) References Cited

U.S. PATENT DOCUMENTS

| 7,757,035 | B2 | 7/2010 | Durham et al. |
| 9,641,325 | B1 * | 5/2017 | Camenisch ......... G06F 9/45558 |
| 9,864,874 | B1 * | 1/2018 | Shanbhag ............... H04L 63/10 |
| 10,545,883 | B2 | 1/2020 | Durham et al. |

(Continued)

OTHER PUBLICATIONS

Intel; Architecture Specification: Intel Trust Domain Extensions (Intel TDX) Module; Document No. 344425-001US; Sep. 2020; 285 pages.

(Continued)

*Primary Examiner* — Mohammad W Reza
(74) *Attorney, Agent, or Firm* — Alliance IP, LLC

(57) ABSTRACT

An apparatus including a processor comprising at least one core to execute instructions of a plurality of virtual machines and a virtual machine monitor; and a cryptographic engine comprising circuitry to protect data associated with the plurality of virtual machines through use of a plurality of private keys and an accessor key, wherein each of the plurality of private keys are to protect a respective virtual machine and the accessor key is to protect management structures of the plurality of virtual machines; and wherein the processor is to provide, to the virtual machine monitor, direct read access to the management structures of the plurality of virtual machines through the accessor key and indirect write access to the management structures of the plurality of virtual machines through a secure software module.

20 Claims, 9 Drawing Sheets

(56) References Cited

U.S. PATENT DOCUMENTS

2003/0133574 A1\* 7/2003 Caronni .................. G06F 21/78
                                                               711/E12.095
2009/0282266 A1\* 11/2009 Fries ..................... G06F 21/602
                                                               713/193

OTHER PUBLICATIONS

Intel; Guest-Host-Communication Interface (GHCI) for Intel Trust Domain Extensions (Intel TDX); Document No. 344426-001US; Sep. 2020; 48 pages.
Intel; "Intel Trust Domain CPU Architectural Extensions;" Document No. 343754-001US; Sep. 2020; 40 pages.
Intel; "Intel Trust Domain Extensions—SEAM Loader (SEAMLDR) Interface Specification;" Document No. 343755-001US; Sep. 2020; 20 pages.
Intel; "Intel Trust Domain Extensions;" White Paper, Document No. 343961-001US; 9 pages.

\* cited by examiner

US 11,641,272 B2

SEAMLESS ONE-WAY ACCESS TO PROTECTED MEMORY USING ACCESSOR KEY IDENTIFIER

TECHNICAL FIELD

This disclosure relates in general to the field of computing systems and, more particularly, to data access and protection.

BACKGROUND

Protecting memory in computer systems from software bugs and security vulnerabilities is a significant concern. A malicious actor may attempt to access data which it is not authorized to access. Integrity protection and encryption are common ways to protect data stored in memory.

BRIEF DESCRIPTION OF THE DRAWINGS

Like reference numbers and designations in the various drawings indicate like elements.

DESCRIPTION OF EXAMPLE EMBODIMENTS

Figure 1:
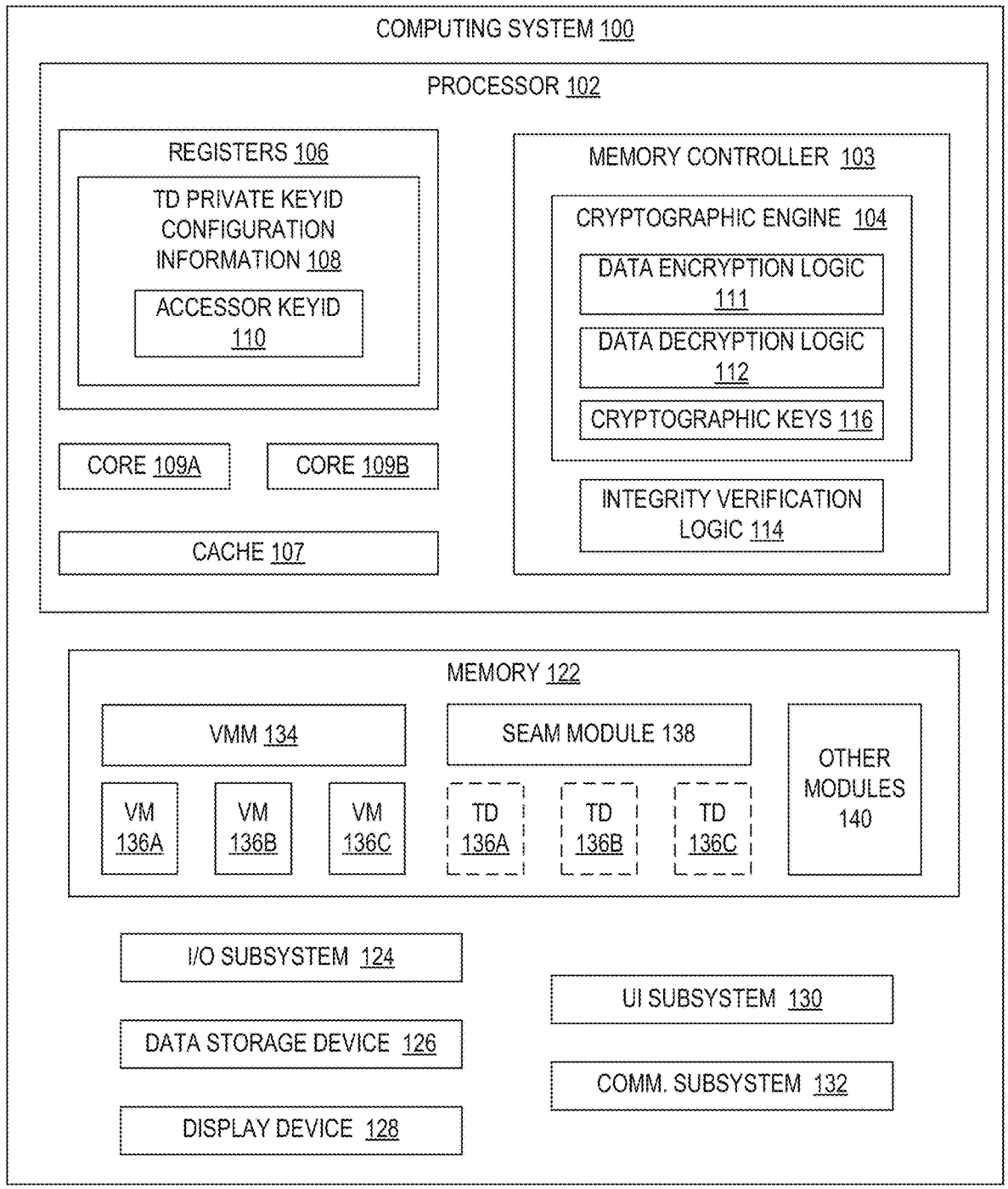
FIG. 1 illustrates a computing system in accordance with certain embodiments.

Cloud security providers (CSPs) may cryptographically isolate customer workloads running on their platforms from each other and from the CSP. In some current architectures, a platform may implement trust domain extensions (TDX) for providing cryptographic isolation on servers and removing CSP software (e.g., a virtual machine monitor (VMM)) from the trust boundary, so that it cannot access private data of the individual virtual machines (VMs) (where the trust boundary associated with a particular VM is referred to as a trust domain (TD)). TDX may provide cryptographic isolation for customer workloads in a cloud environment using a multi-key total memory encryption engine (MKTME) which provides both confidentiality and integrity. Current architectures may also utilize a central processing unit (CPU) mode or other secure processor execution mode referred to as secure-arbitration mode (SEAM) root mode wherein a software module referred to herein as a SEAM module is executed by the CPU to implement VM isolation.

In current architectures, each VM (also referred to herein as a trust domain (TD)), may be assigned its own unique memory encryption key such that the VMM and the other VMs do not have access to the plaintext memory of an encrypted VM (TD). Deterministic access prevention of a TD's private memory may be implemented using a metadata bit, known as the TD bit which is set for data of writes originating from a TD and checked (e.g., by a cryptographic engine such as a MKTME engine) on read accesses. A read access originating from within a TD is allowed to access the data which will then be integrity verified (e.g., by the cryptographic engine) using the accessing TD's private key. When a read access for that data is requested by non-TD software (e.g., VMM) that is not authorized to read the data, poisoned data comprising fixed zeros (or other predetermined value) may be returned back to the software attempting to access the data. While these mechanisms provide the intended protections for TD's private memory to remove the VMM from the trust boundary, they may be overly limiting in that direct access to TD management structures (e.g., TD secure extended page tables (EPTs), nested page tables (NPTs), and page modification logs (PMLs)) is denied to the VMM even though the VMM needs read access to these structures for management functions. The VMM may instead be required to make a call (e.g., through a CPU instruction) to transition the CPU to the SEAM root mode and to have the SEAM module request access to these TD management structures in order to read the structures from memory. Such a call may be referred to as a SEAMCALL. The SEAM module may read the TD's private memory where the management structures are stored and copy and share the memory contents with the VMM at a specified location (e.g., within a shared memory region or via a register) accessible to the VMM. However, the call to the SEAM module may incur significant delays (e.g., thousands of CPU cycles) due to a processor mode switch.

Various embodiments of the present disclosure provide one-way read only access to protected memory (wherein the protection includes encryption and/or integrity protection) to enable a future or legacy VMM (e.g., 134) to support TDs (corresponding to VMs 136) and associated features such as live migration by exposing direct read access to secure TD management structures. In various embodiments, a special key identifier (KeyID) referred to herein as an accessor KeyID 110 (which identifies an accessor key used by the cryptographic engine 104) may be used for both read and write accesses when the CPU is in a SEAM root mode (e.g., executing instructions from the SEAM module 138), but can only be used for read accesses when the CPU is not in a SEAM root mode (e.g., executing instructions by software other than the SEAM module 138, such as instructions from a VMM 134). An attempt by software that is not executing in the SEAM root mode to perform a write operation using this accessor KeyID 110 will be blocked. For example, the page walk circuitry of system 100 may ensure that a write request by the VMM 134 to the memory 122 storing the TD management structures is prevented and instead a page fault is raised, for example, when a special read-only accessor KeyID value is used to access memory the processor may treat the memory access as always read-only, preventing memory stores, when running outside of SEAM root mode. In one example, if the KeyID is the special read-only accessor KeyID 110 accessed by the VMM 134, a resulting translation lookaside buffer (TLB) entry will be set to only allow memory reads and not allow memory writes for the address translation pertaining to the accessor KeyID. A page fault handler in the VMM 134 can handle faults resulting from a write operation using the accessor KeyID (potentially in collaboration with the SEAM module 138). The accessor KeyID 110 can be setup with encryption and integrity or with integrity alone when there are no secrets in the TD management structures that are shared between the TD and the VMM using the accessor KeyID 110, however, ideally the integrity is guaranteed against hardware attacks as well. For a special KeyID value, when the TD bit is set to indicate SEAM mode, both memory loads and stores are allowed, and when the TD bit is indicating a memory access outside of SEAM mode (e.g. the VMM executed the memory access), then the memory may be read but not written (memory loads are allowed but not stores).

Thus, using the special read-only accessor KeyID 110, the SEAM module 138 and the VMM 134 may seamlessly share some data through memory 122 without having to transition processor modes (and thus may avoid incurring the delay associated with a processor mode switch). Various embodiments may enable many functions such as live migration of VMs by allowing faster reads of TD management structures such as private EPT structures (including accessed/dirty (A/D) bits), PMLs, etc. while also ensuring the integrity of these structures by preventing them from being modified outside of the SEAM root mode. Embodiments of the present disclosure may also ensure that the rest of the private memory of a VM 136 that is not explicitly shared by the SEAM module 138 using the accessor KeyID 110 is still protected from the VMM 134 by using TD private KeyIDs. Thus, the security properties required for isolation are still maintained as the VMM 134 cannot directly modify these TD management structures, while other private memory (e.g., code and data) for a TD such as a VM 136 may be protected from access by the VMM 134 via the TD private key (identified by the corresponding TD private KeyID) which is inaccessible to the VMM 134 through the use of the TD bit in memory. Various embodiments include only minimal changes to the hardware of the system 100 and allow for significantly easier software enabling for VM isolation in addition to providing performance benefits, such as reducing the latency incurred by processor mode switching.

In various embodiments, the system may also use KeyIDs to protect the private data of the VMs 136. For example, the processor 102 may only set the TD bit in a memory load transaction for a given address and KeyID if the code is executing in a SEAM mode. The TD bit may be carried through the processor cache hierarchy (e.g., within cache 107) to the memory controller 103, which will then compare the TD bit stored in memory (e.g. in ECC memory devices) to see if the stored TD bit and memory load request TD bit match. If so, the memory controller will read the contents from memory, verify the integrity of the memory contents using the specified KeyID (e.g. using a stored message authentication code (MAC)) and decrypt the memory content using the specified KeyID, and store the decrypted data within the processor cache 107. If either the integrity check fails or the TD bit doesn't match, the memory controller will simply return zeros (or other random data) to the cache and set the line as poisoned.

Referring to FIG. 1 in detail, the computing system 100 may be embodied as any type of electronic device for performing the functions described herein. For example, the computing system 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein.

As shown in FIG. 1, an example computing system 100 includes at least one processor 102, memory 122, input/output subsystem 124, data storage device 126, display device 128, user interface (UI) subsystem 130, and communication subsystem 132. Although not shown, in various embodiments, computing system 100 may also include a graphics processing unit (GPU), which may also include a protected SEAM mode. In further embodiments, system 100 may include one or more hardware accelerators.

The computing system 100 may include other or additional components, such as those commonly found in mobile and/or stationary computers (e.g., various sensors and input/output devices), in other embodiments. Additionally, in some embodiments, one or more of the example components may be incorporated in, or otherwise form a portion of, another component. Each of the components of the computing system 100 may be embodied as software, firmware, hardware, or a combination of software and hardware.

Processor 102 includes memory controller 103, registers 106, cache 107, and one or more cores 109 (e.g., 109A and 109B). The processor 102 may be embodied as any type of processor capable of performing the functions described herein. For example, the processor 102 may be embodied as a single or multi-core central processing unit (CPU), a multiple-CPU processor, a processing/controlling circuit, or multiple diverse processing units or circuits (e.g., a CPU and a Graphic Processing Unit (GPU), etc.).

Registers 106 may include, e.g., general purpose registers, special purpose registers, and model specific registers (MSRs). In the embodiment depicted, registers 106 store TD private KeyID configuration information 108. The information 108 may include any suitable information about the TD private KeyIDs, such as the number of TD private KeyIDs available for use. In one example, information 108 may include a programmable (e.g., via a processor instruction) value that indicates the number of memory address bits that may be used to carry TD private KeyIDs for memory read and write requests (and thus the maximum number of KeyIDs available for use to protect TDs, where in some embodiments each TD is protected with its own key identified by a KeyID). The information 108 may also include an identification of the accessor KeyID 110 (e.g., the information 108 may specify the particular value of the accessor KeyID 110, which may be within the address space of the TD private KeyIDs or some other address space, or may specify a location of the accessor KeyID 110).

Cryptographic engine 104 includes data encryption logic 111, data decryption logic 112, and cryptographic keys 116. Data encryption logic 111 is to encrypt data based on various cryptographic keys 116 and data decryption logic 112 is to decrypt data based on the cryptographic keys 116. Integrity verification logic 114 of the memory controller 103 provides integrity verification operations. For example, integrity verification logic 114 may calculate a message authentication code (MAC) for data written to memory 122 and may store the MAC with the data (e.g., in the same cacheline). When the memory address at which the data is stored is accessed via a read command, the integrity verification logic 114 may calculate a MAC based on the data read from memory 122 and compare the MAC against the MAC read from the memory 122 to determine whether the data accessed is the same as the data that was written to the memory address. If the MACs do not match, cryptographic engine 104 may perform one or more of: trigger a page fault (or other type of fault), set the value of the data returned for the access to a predetermined value (e.g., each bit may be set to zero), and mark the returned data as poisoned so it is not treated as valid data by the requesting entity. Responsive to a write request, the MAC may be calculated before encryption of the data, in conjunction with encryption of the data, after encryption of the data, or independent of encryption (e.g., the key may be used to generate the MAC if encryption is not used). Responsive to a read request the MAC may be calculated before decryption of the data, in conjunction with decryption of the data, after decryption of the data, or independent of encryption of the data (e.g., computed regardless of whether the data is encrypted or not).

Cryptographic keys 116 may comprise the accessor key identified by accessor KeyID 110, a plurality of TD private keys, and any other suitable keys, such as shared keys that may be used by the VMM to access data shared by VMs. In some embodiments, the shared KeyID space may be a different memory address space (e.g., may use different bits) from the memory address space of the TD private keys).

In various embodiments, the cryptographic engine 104 may be an MKTME engine that uses a different cryptographic key 116 (or set of keys) for each VM 136 hosted by the system 100. In various embodiments, any suitable cryptographic or integrity protections (e.g., via MAC generation) may be implemented by the cryptographic engine 104. As just one example, the cryptographic engine 104 may provide cryptographic and confidentiality protection using Advanced Encryption Standard (AES) in xor-encrypt-xor-based tweaked-codebook mode with ciphertext stealing (XTS) mode and integrity protection using a SHA-3-based MAC for each integrity-protected cacheline written to memory 122. In some embodiments, MACs may be stored in ECC devices and read in parallel as error correcting codes may be stored in sequestered memory separately read/written corresponding to the data.

The CPU may indicate the TD bit in a memory request and the memory controller 103 may also set the TD bit for a write originated by a SEAM managed VM (TD) 136. In some embodiments, the TD bit is set on a per cacheline granularity (or other granularity consistent with a write instruction granularity). The TD bit may be set in association with use of a TD private KeyID specified (e.g., within address bits) by a write instruction and thus the VMM 134 may not access such cachelines. When read data includes a set TD bit, the cryptographic engine 104 may also check to ensure that the calling entity is authorized to access the data (e.g., by checking the address of the calling instruction to determine if it is from an entity authorized to access the data). In some embodiments the read instruction may include the KeyID within address bits of the read instruction and the calling address of the instruction may be checked against the authorized address space for the particular KeyID to determine whether the access is being made by the associated TD.

The memory 122 of the computing system 100 may be embodied as any type of volatile or non-volatile memory or data storage (or combination of these) capable of performing the functions described herein. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in memory is synchronous dynamic random access memory (SDRAM). In particular embodiments, DRAM of memory 122 complies with a standard promulgated by the Joint Electron Device Engineering Council (JEDEC), such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Non-volatile memory is a storage medium that does not require power to maintain the state of data stored by the medium. Nonlimiting examples of nonvolatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory.

In some embodiments, memory 122 comprises one or more memory hardware modules, such as dual in-line memory modules (DIMMs). In some embodiments, the memory 122 may be located on one or more integrated circuit chips that are distinct from an integrated circuit chip comprising processor 102 or may be located on the same integrated circuit chip as the processor 102. Memory 122 may comprise any suitable type of memory and is not limited to a particular speed or technology of memory in various embodiments. Some embodiments may use ECC DIMMs that have additional chips and wiring for the purpose of error detection and correction, these additional memory devices may also be used to store the TD bit and integrity MAC values for each corresponding cacheline/memory line.

In operation, the memory 122 may store various data and software used during operation of the computing system 100, as well as operating systems, applications, programs, libraries, and drivers. Thus, memory 122 may store data and/or sequences of instructions that are executed by the processor 102. In the embodiment depicted, memory 122 stores information (e.g., program code, data, management structures, etc.) for a VMM 134, any number of TDs 136 (which correspond to VMs 136 that are managed through SEAM), a SEAM module 138, other VMs that are not managed through SEAM (not shown), and other modules 140.

Other modules 140 may include a number of computer program components, such as one or more user space applications or other applications. Any of these modules 140 may be embodied as any computer application (e.g., software, firmware, hardware, or a combination thereof). Some examples of other modules 140 include word processing programs, document viewers/readers, web browsers, electronic mail programs, messaging services, computer games, camera and video applications, etc. Some of these workloads may run in virtual machines individually encrypted and managed by SEAM to prevent direct access by the VMM.

VMM 134 (also known as a hypervisor) may comprise logic to create and run VMs 136. The VMM 134 may present guest operating systems run by VMs 136 with a virtual operating platform (e.g., it appears to the VMs that they are running on separate physical nodes when they are actually consolidated onto a single hardware platform) and manage the execution of the guest operating systems by system 100. Services of VMM 134 may be provided by virtualizing in software or through hardware assisted resources that require minimal software intervention, or both. Multiple instances of a variety of guest operating systems may be managed by the VMM 134.

VMM 134 may be a native or bare-metal hypervisor that runs directly on system 100 to control the system logic and manage the guest operating systems. Alternatively, VMM 134 may be a hosted hypervisor that runs on a host operating system and abstracts the guest operating systems from the host operating system.

A VM 136 may emulate a computer system with its own dedicated hardware. A VM 136 may run a guest operating system on top of the VMM 134. The components of system 100 (e.g., processor 102, cryptographic engine 104, memory 122, I/O subsystem 124, data storage device 126, display device 128, a GPU (not shown), UI subsystem 130, communication subsystem 132) may be virtualized such that it appears to the guest operating system that the VM 136 has its own dedicated components.

The SEAM module 138 may be a security-services module that helps enforce security policies for the TDs. In some embodiments, the SEAM module 138 may be digitally signed so that authorship of the SEAM module 138 may be ascertained by a user of the system 100 (e.g., to indicate trustworthiness of the SEAM module 138). The SEAM module 138 may be hosted in a reserved memory space (e.g., of memory 122 or other memory of the computing system 100) identified by a range register (which may be referred to as a SEAM-range register (SEAMRR)). The processor 102 may only allow access to the SEAM-memory range to software executing inside the SEAM-memory range and all other software accesses and direct-memory accesses from devices to this memory range are not allowed.

The SEAM module 138 may be installed by an authenticated-code module (ACM) which may be referred to as a SEAM loader, which may help verify the digital signature on the SEAM module and load the SEAM module into the SEAM-memory range. When the SEAM module is loaded into the SEAM-memory range, attributes of the SEAM module (e.g., a version number of the SEAM module) may be stored in a register 106 of the processor to be checked against security policies of a user (e.g., a cloud service provider) of the system 100. Embodiments may allow the VMM to read (but not modify) the SEAM code and configuration (everything excluding secret information such as secret memory encryption keys, RSA keys, private keys, etc. which may be stored in a hidden memory region or encrypted with a private memory encryption key) in order to verify the SEAM module is installed and configured correctly (and therefore may be trusted by the VMM). In various embodiments, the SEAM code and configuration may also be protected by the accessor KeyID 110. For example, the SEAM code itself could be readable to the VMM 134 (e.g., this could help the VMM verify that the SEAM module 138 was correctly patched to a new version). Similarly, the interrupt descriptor table (IDT) of SEAM could be made readable to the VMM via the accessor KeyID 110.

In some embodiments, the processor 102 may operate in multiple different SEAM modes. For example, the processor 102 may operate in a SEAM root mode and a SEAM non-root mode. A SEAM root mode may be the highest privilege mode. It may allow the SEAM module 138 to manage hardware, control registers, extended page tables, interrupts, Software Management Mode (SMM), and generally remain separate and protected from the TDs (secure VMs) that the SEAM module manages. In the SEAM non-root mode, the TDs may execute, running with reduced privileges and limited access to hardware and memory (e.g. as controlled by the SEAM managed secure extended page tables).

A SEAMCALL instruction may be called by the VMM 134 to place the processor 102 into a SEAM root mode and invoke the SEAM module 138. The SEAM module 138 may provide an interface to the VMM 134 to create, delete, and schedule execution of TDs (e.g., VMs 136). As part of the TD (e.g., VM 136) creation, the VMM 134 sets up the memory pages for the TD code, data, and TD-associated-metadata structures.

The processor 102 may also operate in a SEAM non-root mode to execute more limited instructions from the TDs (e.g., VMs 136). The SEAM non-root mode may be entered using VMRESUME and VMLAUNCH (or other suitable instructions) to execute the TD within the memory regions mapped to the TD via the SEAM managed secure extended page table (S-EPT). This EPT structure is an example of a SEAM managed structure that may be shared as read-only with the VMM using the accessor KeyID 110. A SEAMRET instruction (or other suitable instruction) returns execution control to the VMM 134.

The private keys for the TDs may also be created by the SEAM module 138 (e.g., responsive to a request from the VMM 134). For example, the SEAM module 138 may call a PCONFIG instruction to program a unique key generated by processor 102 for each KeyID used. The keys (e.g., 116) may be programmed into the cryptographic engine 104.

The memory 122 is communicatively coupled to the processor 102, e.g., via the I/O subsystem 124. The I/O subsystem 124 may be embodied as circuitry and/or components to facilitate input/output operations with the processor 102, the memory 122, and other components of the computing system 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with one or more of the processor 102, the memory 122, and/or other components of the computing system 100, on a single integrated circuit chip. Other processing components such as the GPU may share the same memory 122 as the processor with a SEAM mode to allow GPU execution engines to use shared virtual memory (SVM) to access VM and TD memory directly using the same page table translations. Here the GPU would have a SEAM mode to set the TD bit when running in a trusted configuration and use the S-EPTs to access private key IDs to read and/or write TD memory when TDs opt into using the GPU (or other accelerator) directly as a trusted co-processor.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices. In various embodiments, memory 122 may cache data that is stored on data storage device 126.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing system 100. The display device 128 may be part of the user interface (UI) subsystem 130. The user interface subsystem 130 may include a number of additional devices to facilitate user interaction with the computing system 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing system 100.

The computing system 100 further includes a communication subsystem 132, which may be embodied as any communication circuit, device, or collection thereof, capable of enabling communications between the computing system 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. In some embodiments, the communication subsystem 132 may be embodied as a network adapter, such as a wireless network adapter.

Figure 2:
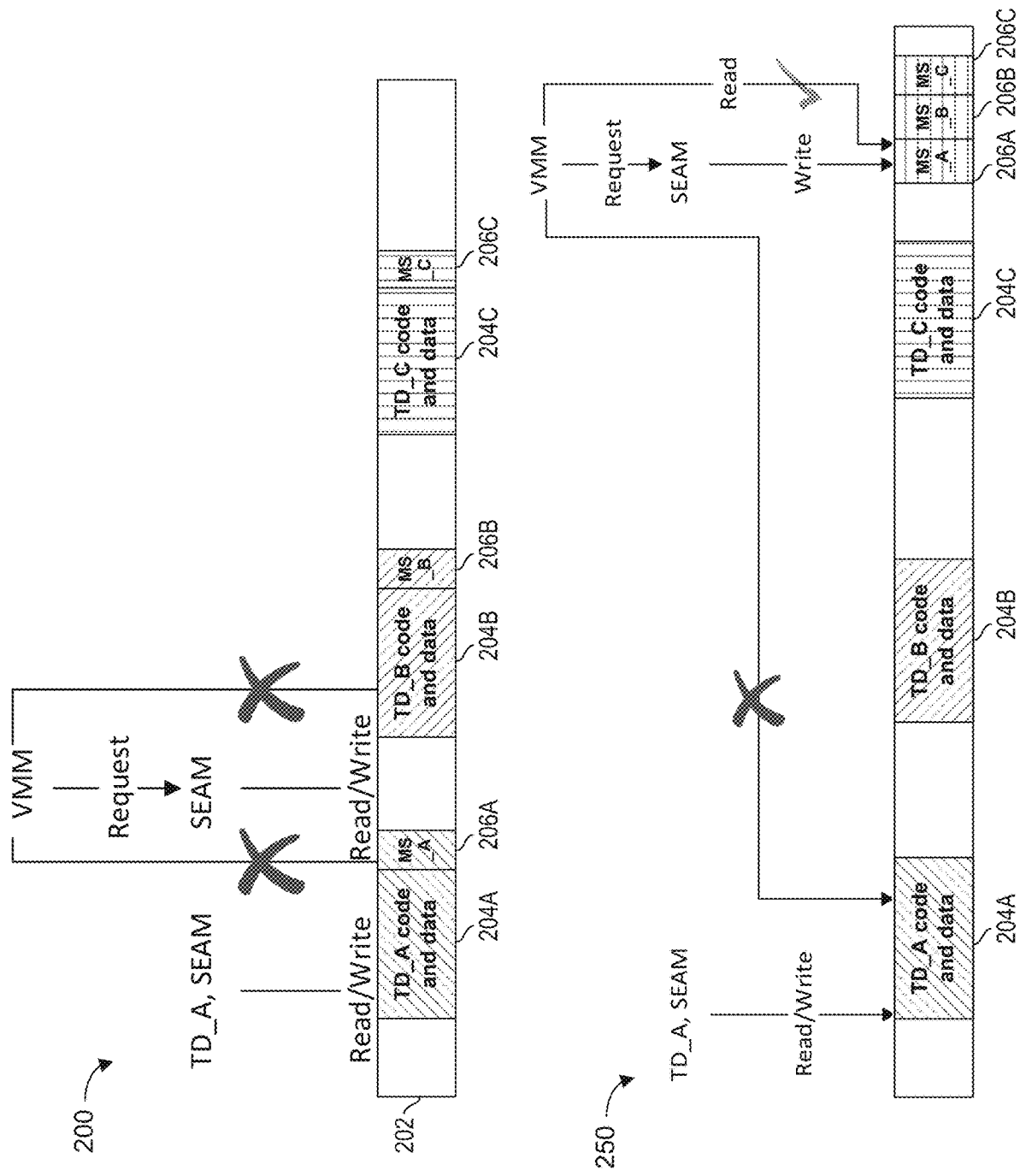
FIG. 2 illustrates a current architecture in which a trust domain (TD)'s private key is used to protect data associated with a TD and a proposed architecture in which TD management structures are instead protected by an accessor key in accordance with certain embodiments.

FIG. 2 illustrates a current architecture 200 in which a TD's private key is used to encrypt the code and data 204 (e.g., 204A, 204B, or 204C) of a TD as well as management structures 206 (e.g., 206A, 206B, or 206C), such as memory management or other control structures of the TD. FIG. 2 also illustrates a proposed architecture 250 in which the management structures of the TDs are instead encrypted by an accessor key identified by accessor KeyID 110 in accordance with certain embodiments, allowing a VMM 134 to quickly and directly access (in a restricted way, e.g. read-only) the management structures (e.g. S-EPTs, VMCSs, PMLs, etc.) by using the accessor key ID 110.

Code and data 204 of a TD may include program instructions of the TD that are executed by a core of the processor 102 (e.g., in SEAM non-root mode) as well as any suitable data supporting the operations of the TD (e.g., data generated during execution of the TD). Management structures 206 may include any suitable data structures supporting the operation of their respective TDs that may be shared with the VMM 134. For example, a management structure 206 may include an extended page table (e.g., a secure extended page table) or nested page table for the corresponding TD. Such a page table may be built by the VMM 134 and may provide guest physical address (GPA) to host physical-address (HPA) translations. These page tables may be used in conjunction with page tables built by the individual VMs (e.g., via the operating systems of the VMs) that map virtual addresses (sometime referred to as linear addresses) to guest physical addresses in order to obtain a physical memory address mapped to a virtual address when memory 122 is accessed by the VMM 134 or a VM 136. When an access to memory 122 is received from a TD (e.g., TD_A) using a virtual (or linear) address, page walk circuitry of the processor 102 will walk the page table of the VM to obtain the guest physical address (that maps to a virtual memory address specified in the access) and then will walk the extended page table or nested page table to obtain the physical address that corresponds to the guest physical address. This mapping is then cached in a translation lookaside buffer (along with permissions) so the processor may quickly translate virtual to physical addresses on subsequent accesses. Thus, only the guest physical address (and not the physical address) of the memory is exposed to the TD.

A management structure 206 (e.g., 206A) may also include, for the corresponding TD (e.g., TD_A), a page modification log and accessed/dirty (A/D) bits that are stored within or in association with the extended page table or nested page table. The A/D bits may indicate whether a memory page has been accessed (A) or written to and are thus dirty (D) by the TD and may be used for paging and other management operations (e.g., defragmentation, copy on write). The page modification log may include a record of guest physical addresses that have been recently written to such that the VMM 134 does not need to walk the extended page table or nested page table to detect which pages were recently written to. The page modification log may be updated at the same time that the A/D bits are updated responsive to a write operation. Other structures may include the virtual machine control structures (VMCS) managed but the SEAM module 138, which include the configuration and execution state of the VMs 136, information that the VMM may need to read, avoiding a SEAM call to access these structures or portions thereof using the accessor KeyID.

Current architecture 200 includes a memory 202 (which may correspond to or include any of the characteristics of memory 122) storing code and data (204A-C) for three TDs (TD_A, TD_B, and TD_C) along with the associated management structures, MS_A, MS_B, and MS_C (206A-C). Although FIG. 2 depicts three different TDs, in various embodiments system 100 may support any number of TDs. In current architecture 200, each TD's private code and data and management structures are encrypted and integrity protected with the corresponding TD's private key. For example, TD_A's code and data 204A and management structures 206A are each protected by a private key of TD_A, TD_B's code and data 204B and management structures 206B are each protected by a private key of TD_B, and so on. The owning TD and the SEAM module 138 have read and write access to the TD's code and data and only the SEAM module 138 has direct access to the management structures 206. In order to update or access the management structures, the VMM 134 makes SEAMCALLs to the SEAM module 138 to request update/access to management structures 206. As an example, construction of secure EPTs for a TD is accomplished through the VMM 134 making SEAMCALLs to the SEAM module 138, which then constructs the TD's secure EPT structure on behalf of the VMM 134. The VMM is disallowed direct access to TD's private code and data and associated management structures. Some embodiments may set these structures to be read only or not-present in the VMM's protected memory via page tables such that page faults will be generated when the VMM attempts to read or write to the structures, and these page faults may then be converted into SEAMCALLs containing the desired memory write modifications or memory reads attempted by the VMM. This isolation is achieved by the architecture by the processor not allowing the VMM 134 to use any TD private KeyID (where a TD private KeyID identifies a cryptographic key 116 utilized by the cryptographic engine 104 to encrypt or decrypt data of a TD). For example, a single bit (referred to earlier as the TD bit or memory ownership bit) stored in error correction code (ECC) metadata associated with a cacheline (or other unit) of a TD's code or data may be used for indicating memory ownership and upon each read, the value of this bit is read from memory and checked with the incoming access to ensure that the source of the incoming access matches the owner of the data line. As an example, for TD data, the TD bit will be set to 1 and the VMM's attempt to access TD data would result in a TD bit mismatch at the memory controller 103 and the access may deterministically return all zeros or other predetermined value. As an aside, in some embodiments, data associated with a TD may be marked as shared data, in which case the VMM may access such data with a shared KeyID, but an attempt by the VMM to use a shared KeyID to access private TD data would naturally result in an integrity failure. Thus, in the current architecture 200 the SEAM module 138 and the owning TD are allowed access to the TD private memory (code and data 204) and only the SEAM module 138 is allowed direct access to the management structures.

While disallowing VMM access to the private code and data to ensure VMM is out of the trust boundary is desired behavior to protect the TDs from the VMM, disallowing direct access to the management structures is not required and may hinder performance. More specifically, the VMM 134 may benefit greatly from direct read access to some management structures to implement its management functions. As an example, EPTs may need to be accessed for paging and TD migration. In the current architecture 200, VMM 134 is provided indirect read access to these structures using SEAMCALLs. However, using SEAMCALLs requires an expensive mode switch and additional enabling for VMMs which generally access these structures directly in memory.

The proposed architecture 250 introduces the concept of an accessor KeyID 110 identifying a single encryption key (accessor key) used to protect the management structures of multiple TDs (e.g., MS_A, MS_B, MS_C), while each TD retains its own unique private encryption key for its private code, page tables, and data. From a security standpoint, the management structures 206 do not need to be protected with their own separate keys (although in alternate embodiments each management structure could be protected with its own separate key or multiple accessor keys could be used wherein each accessor key protects management structures of one or more TDs). The SEAM module 138 will set up the accessor KeyID and the associated accessor key is not made visible outside of a SEAM mode. The SEAM module 138 will also use the accessor KeyID 110 to create the management structures 206 to be shared with the VMM 134 (e.g., these management structures 206 may be encrypted and/or integrity protected using the accessor key).

When setting up access to memory pages accessible via the accessor KeyID 110, the SEAM module 138 may map, through its page tables, those memory pages that use the accessor KeyID 110. Subsequently, reading or writing to those mapped memory pages will result in the accessor KeyID 110 being used. The TD bit will indicate that the SEAM module 138 is allowed to write to those pages using the accessor KeyID 110. The VMM 134 will act similarly (mapping the physical addresses of the same pages using the Accessor KeyID 110), but the VMM may set its page table entries for those physical pages with the accessor KeyID 110 to read only (not write) permissions as the processor 102 will force this state when the VMM 134 accesses memory using the accessor KeyID 110. Thus, the VMM 134 writing to such pages will cause a page fault.

As in the current architecture 200, in the proposed architecture 250 a TD's private code and data can only be accessed by the owning TD and the SEAM module 138. In order to ensure the desired security, the private code and data for each TD is still encrypted with a TD-specific unique key and any attempt by the VMM 134 to access the TD's private code and data will either result in a deterministic value (e.g., all zeros) being returned or an integrity failure due to access using an incorrect KeyID. However, in the proposed architecture 250, the VMM 134 can directly read the management structures 206 using the accessor KeyID 110. However, any write to these management structures by the VMM is blocked (e.g. generates a page fault) and is still required to go through the SEAM module 138 via a SEAMCALL. Hence, the accessor KeyID 110 provides one way secure direct access to TD memory that SEAM explicitly allows to be accessed by the VMM. While this specification focuses on the sharing of management structures (e.g., EPT, VMCSs, PMLs etc.), in various embodiments any suitable sharing between TDs and the VMM 134 may be enabled using the accessor KeyID.

With the current architecture (e.g., 200), the KeyID space is divided by a Basic Input/Output System (BIOS) for shared KeyIDs (which are available for use by the VMM to access shared TD memory) and private KeyIDs (available for use by the SEAM module 138 for private TD memory). The BIOS may be responsible to set up this split of the KeyID space. In a particular embodiment, one KeyID in the private KeyID space is reserved by the BIOS to be used as the accessor KeyID. In order to enable this, in one embodiment, a new model-specific register (MSR) (e.g., IA32_ACCESSOR_KEYID) is introduced. BIOS can set up the accessor KeyID (e.g., using a WRMSR instruction) using the IA32_ACCESSOR_KEYID register. For example, the KeyID itself or a reference to the location of the KeyID may be stored in the IA32_ACCESSOR_KEYID register. BIOS uses one of the private KeyIDs as the accessor KeyID. Since BIOS is not trusted for VM isolation, MCHECK (or some other trusted module that checks machine configuration) may be utilized to verify that the accessor KeyID set up by the BIOS is one of the private KeyIDs. The SEAM module 138 and the VMM 134 can then read (e.g., using a RDMSR instruction) the IA32_ACCESSOR_KEYID register to ascertain the KeyID set up by the BIOS as the accessor KeyID. By using one of the private KeyIDs as the accessor KeyID, non-SEAM software is prevented from changing or controlling the programming (e.g., the key or encryption mode) associated with the accessor KeyID using a key programming instruction (e.g., PCONFIG).

The SEAM module 138 does not use the accessor KeyID to access the private code, OS level page tables or data of any TD. Instead, the management structures 206 (or other data) for which the SEAM module 138 intends to allow VMM read access to are encrypted and integrity protected by the SEAM module 138 using the accessor KeyID when they are written to memory 122. In some embodiments, the data shared using the accessor KeyID may not have confidentiality requirements and thus may be unencrypted but may simply be integrity protected using the accessor KeyID (e.g., the accessor key may be used to generate the MACs associated and stored with such data).

Figure 3:
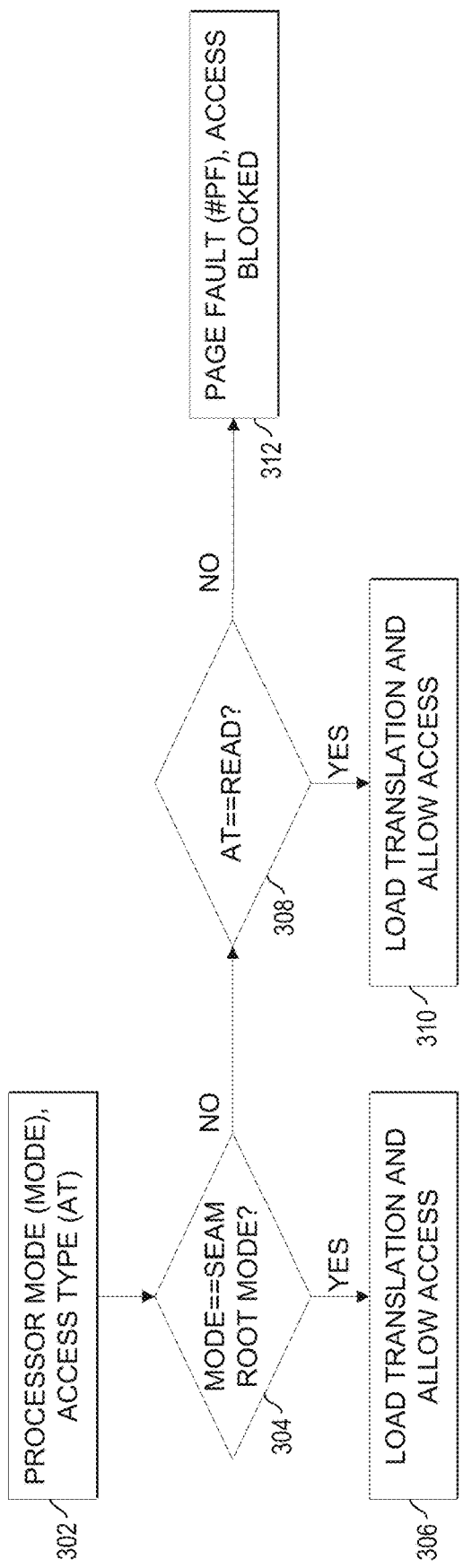
FIG. 3 depicts a flow for servicing an access request specifying an accessor KeyID in accordance with certain embodiments.

FIG. 3 depicts a flow for servicing an access request specifying the accessor KeyID 110 in accordance with certain embodiments. The page mishandler (PMH) hardware of the system 100 may enforce the access control desired for the accessor KeyID. The flow shows what happens when the page table walk is triggered by a miss in the translation lookaside buffer (TLB) due to an access specifying the accessor KeyID 110 for a given memory address (where the TLB may function as a cache for the page table translations which are stored in memory 122).

At 302, the PMH hardware receives or otherwise identifies an indication of the current mode of processor execution and the memory access type (e.g., read or write) that resulted in the page table walk to fill the TLB. At 304, the PMH hardware determines whether the processor is executing in SEAM root mode or not. If the processor is executing in SEAM root mode (and thus is executing instructions from the SEAM module 138), the PMH walks the page tables and loads the translation of the virtual address to physical address to the TLB to allow access regardless of the access type at 306 (in accordance with the SEAM configured page table permissions). This ensures that the SEAM module 138 has unrestricted access to all memory as it does in the current architecture (e.g., 200).

At 304, if the processor mode is not SEAM root mode (e.g., the processor is in a standard execution mode and thus presumably the instruction referencing the accessor KeyID 110 is from the VMM 134), the PMH hardware checks whether the access is a read access at 308. If the access type is read access, at 310 the PMH loads the translation of the virtual address to physical address to the TLB to allow access, where the TLB caches the memory access permission as read only for the translated address. This ensures that a VMM 134 accessing a page with an accessor KeyID 110 is allowed read access without having to jump through additional hoops by making explicit SEAMCALLs for each memory read attempt. VMM reads from memory protected by the accessor KeyID 110 (such as secure EPTs) may be directly made to memory 122 with conventional load memory operations.

However, if the VMM requests a write access, at 312 the PMH hardware signals a page fault and access is blocked. In alternative embodiments, the PMH hardware may respond differently to a write attempt by the VMM to prevent the VMM from writing to the memory protected by the accessor KeyID. For example, the PMH hardware may signal a general protection fault (#GP). Some embodiments may use a page fault handler to translate the attempted memory store operation into a SEAMCALL on behalf of the VMM, thus, preserving code compatibility with legacy VMMs.

In a particular embodiment, the VMM 134 may implement a page fault handler to catch page faults that occur when the VMM tries to write directly to a TD's management structure 206, e.g., as a legacy VMM may try to do. The page fault handler may, responsive to a page fault, make a SEAMCALL to request a processor mode switch to SEAM root mode to obtain assistance to implement the desired write functionality. The implementation of such a page fault handler allows for much simpler enablement in legacy VMMs for VM isolation as the interaction with SEAM can be handled with this single page fault or exception handling module instead of embedding the functionality deep in each VMM's management routines. Thus, in some embodiments, the page fault handling module may intercept write attempts to structures such as EPTs and translate those into SEAM-CALLs calls so that the SEAM module 138 can perform the writes, e.g. to secure EPTs, whereas the legacy VMM EPT editing code need not change.

In various embodiments, additional write support may be added to the VMM 134 to allow VMM write accesses to areas protected by the accessor KeyID 110 to be batched together into a bulk SEAM call, such that the processor 102 may switch into the SEAM root mode once, perform all of the writes, and then switch back to the previous processor mode. In other embodiments, the processor may allow masked or limited memory writes by the VMM, e.g. using techniques described in "METHOD FOR OPTIMIZING VIRTUALIZATION TECHNOLOGY AND MEMORY PROTECTIONS USING PROCESSOR-EXTENSIONS FOR PAGE TABLE AND PAGE DIRECTORY STRIPING", U.S. Pat. No. 7,757,035. For example, the processor may allow the VMM only write access to the available bits or the A/D bits in the extended page table entries. Thus, some embodiments may go beyond read-only memory to allow restricted memory modifications only to specific bits, bytes or other locations within a memory page or cacheline.

As alluded to above, a VMM could attempt to access any TD's private memory. Allowing VMM access to TD memory can open TDs up to several attacks such as software replay and dictionary attacks. However, with integrity enabled on the accessor KeyID 110, an attempt by the VMM 134 to access any TD's memory with the accessor KeyID 110 will result in an integrity failure. Additionally, even though the accessor KeyID 110 may be carved out from the private KeyID space, in various embodiments the TD bit associated with each cacheline in memory is not set when a write is made through the accessor KeyID 110. This ensures that the VMM 134 can continue to read the memory protected with the accessor KeyID 110 without TD bit mismatching but any attempt by the VMM 134 to read TD private memory with the accessor KeyID 110 will result in an integrity failure. The TD bit generation and checking logic in the cryptographic engine 104 may conform to the flows shown in FIG. 4 and FIG. 5.

Figure 4:
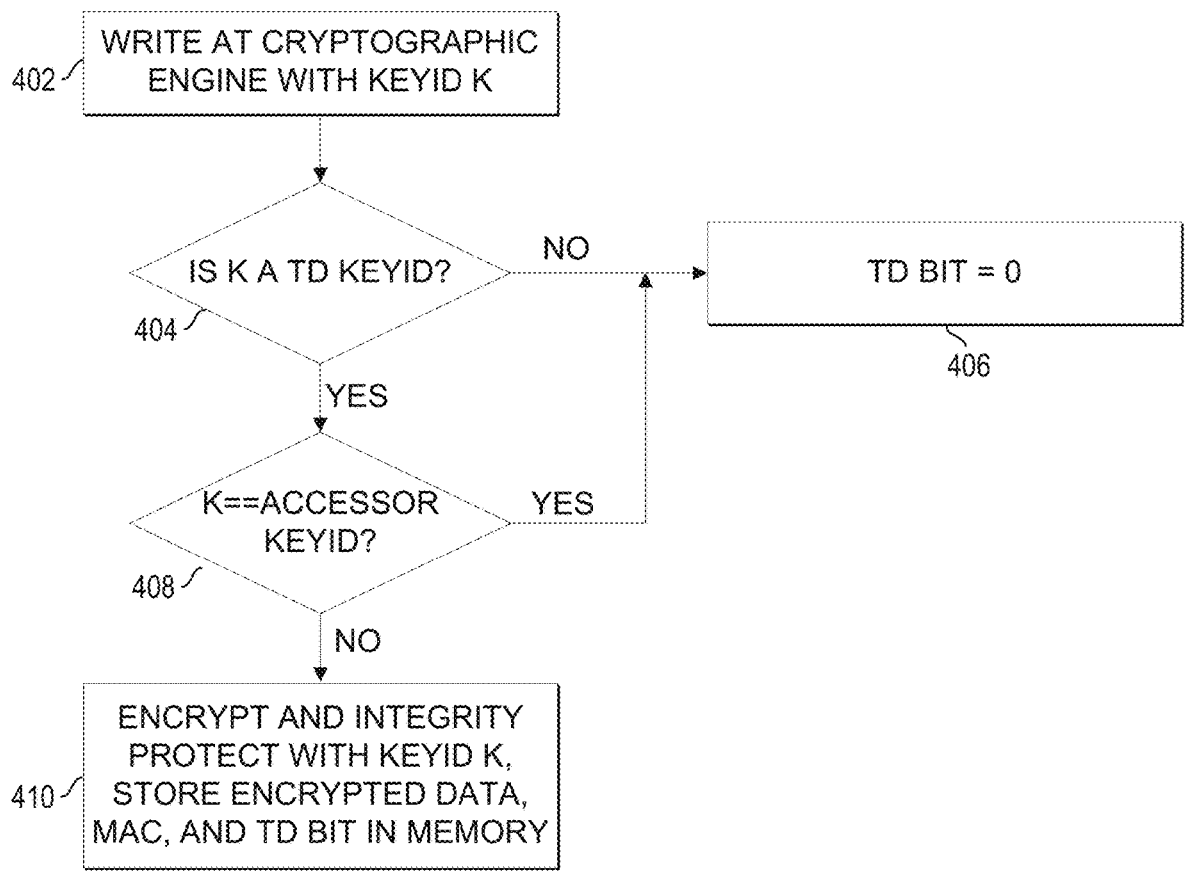
FIG. 4 illustrates a flow for writing data using a KeyID in accordance with certain embodiments.

FIG. 4 illustrates a flow for writing data using a KeyID in accordance with certain embodiments. At 402, a write command that references a KeyID "K" is received at memory controller 103 (e.g., at the cryptographic engine 104). The memory controller 103 may determine whether K is a TD KeyID (e.g., whether the reference to the KeyID is within the address space of the private KeyIDs) at 404. If K is not a TD KeyID, then the TD bit is set to zero at 406 and the write may proceed (the rest of the write flow is not depicted). If K is a TD KeyID, then a determination is made at 408 as to whether K is an accessor KeyID 110. If K is an accessor KeyID then the TD bit is set to 0 at 406 and the write may proceed if the processor is in the SEAM root mode. If K is not an accessor KeyID (and thus corresponds to a TD's private key), then at 410, the write data is encrypted and integrity protected using the TD key corresponding to KeyID K, and the encrypted write data, corresponding MAC, and TD bit (which is set to 1 in this instance) are stored in memory (e.g., 122).

Figure 5:
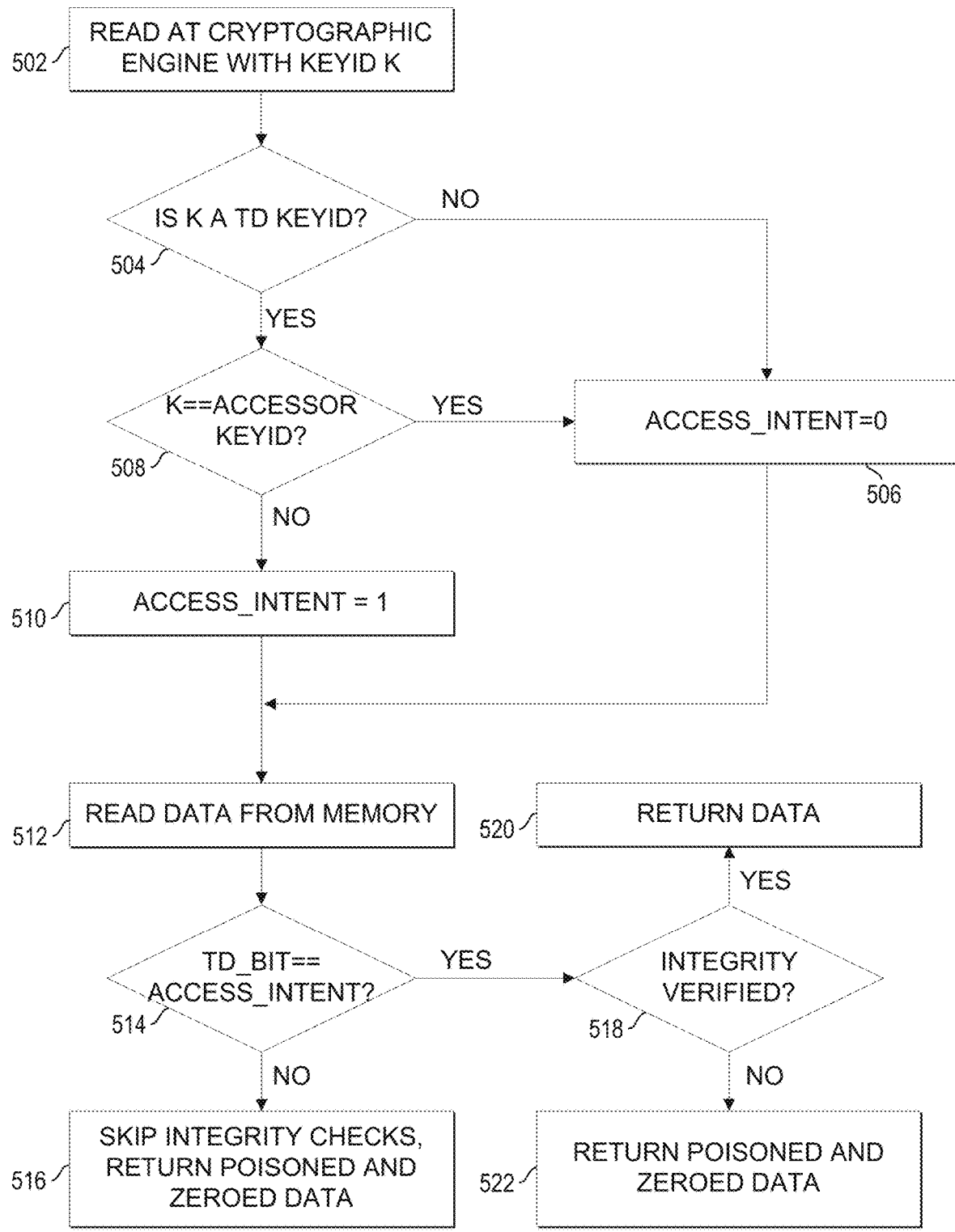
FIG. 5 illustrates a flow for reading data using a KeyID in accordance with certain embodiments.

FIG. 5 illustrates a flow for reading data using a KeyID in accordance with certain embodiments. At 502, a read access request that references a KeyID K is received at memory controller 103 (e.g., at the cryptographic engine 104). At 504, a determination of whether K is a TD KeyID is made. If the KeyID is not a TD KeyID (e.g., K is a shared KeyID), then an access_intent value is set to 0 at 506. The access-_intent value may be used to track whether an access is for a TD's private data (in which case it may be set to 1) or an access is not for a TD's private data (in which case it may be set to 0). If it is determined at 504 that K is a TD KeyID, then a determination is made at 508 as to whether K is an accessor KeyID 110. If it is, then access_intent is set to 0 at 506. If K is not an accessor KeyID 110, then access_intent is set to 1 at 510. After 506 or 510, the flow resumes at 512, where the data (and associated metadata such as a MAC and a TD bit) is read from memory.

At 514, a determination is made as to whether the value of the read TD bit equals the access_intent value. If the value of the TD bit is not equal to the access_intent value (indicating that an unauthorized entity is attempting to access TD private memory or that an entity is attempting to use a TD's private key to decrypt data that is not part of a TD's private memory), then integrity checking of the data is skipped, the data returned is marked as poisoned, and the data is set to all zeros (or other predetermined value).

At 514, if the TD bit is equal to the access_intent value (indicating that the read is for non-TD data or that the read is for private TD data but is authorized), then the integrity is verified at 518 (e.g., by calculating a MAC on the retrieved data and checking it against a MAC read with the data). If integrity verification passes at 520, then the data is returned to the entity requesting the read. If the integrity verification does not pass, the data is marked as poisoned and all zeros (or other predetermined value) is returned. Additionally or alternatively, page faults may be triggered at 516 or 522.

The flows described in FIGS. 2-5 are merely representative of operations or communications that may occur in particular embodiments. In other embodiments, additional operations or communications may be performed in the flows. Various embodiments of the present disclosure contemplate any suitable signaling mechanisms for accomplishing the functions described herein. Some of the operations illustrated in FIGS. 2-5 may be repeated, combined, modified, or deleted where appropriate. Additionally, operations may be performed in any suitable order without departing from the scope of particular embodiments.

FIGS. 6-9 are block diagrams of exemplary computer architectures that may be used in accordance with any of the embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 6-9.

Figure 6:
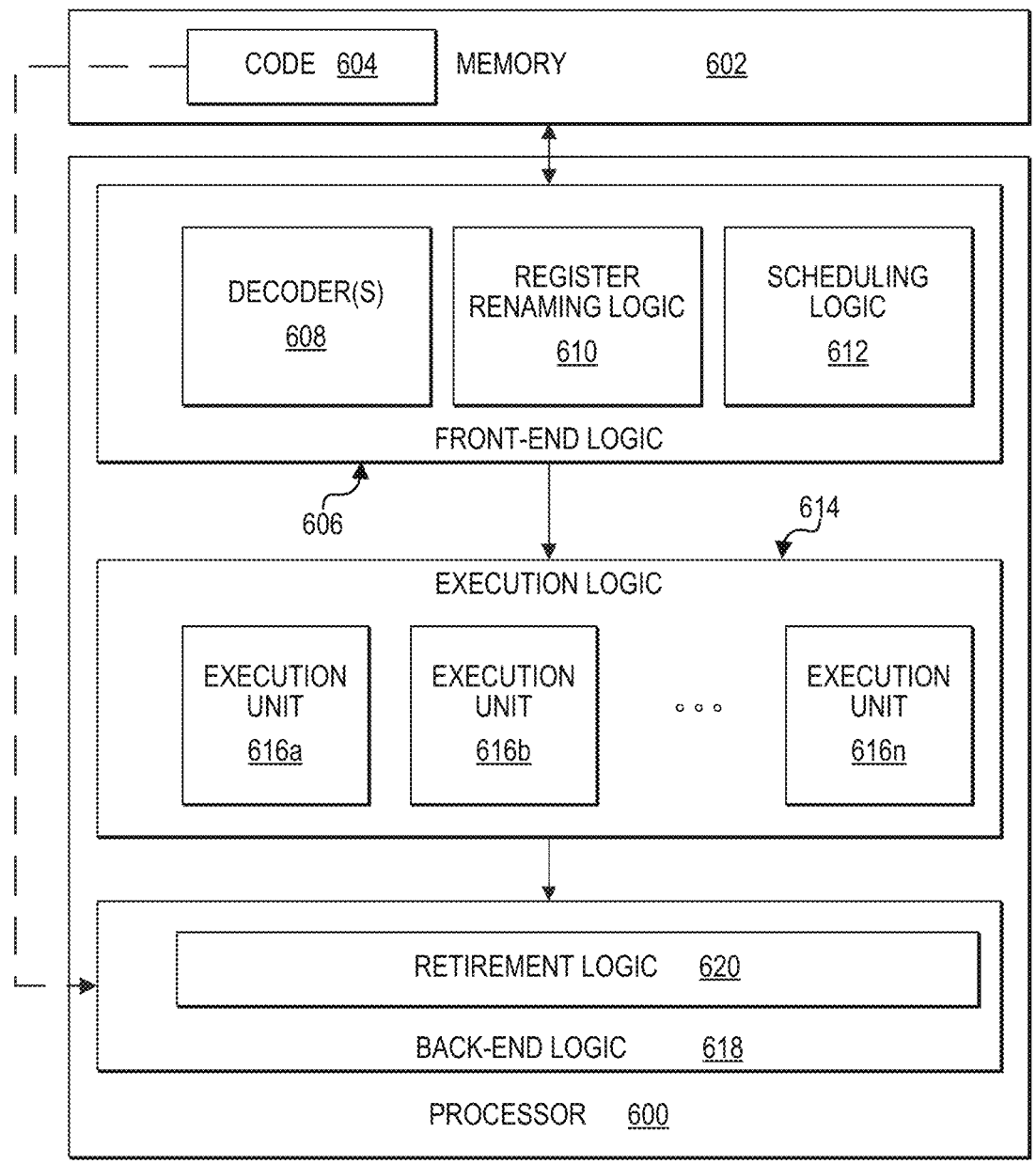
FIG. 6 is a block diagram illustrating an example processor core and memory according to at least one embodiment.
Figure 7:
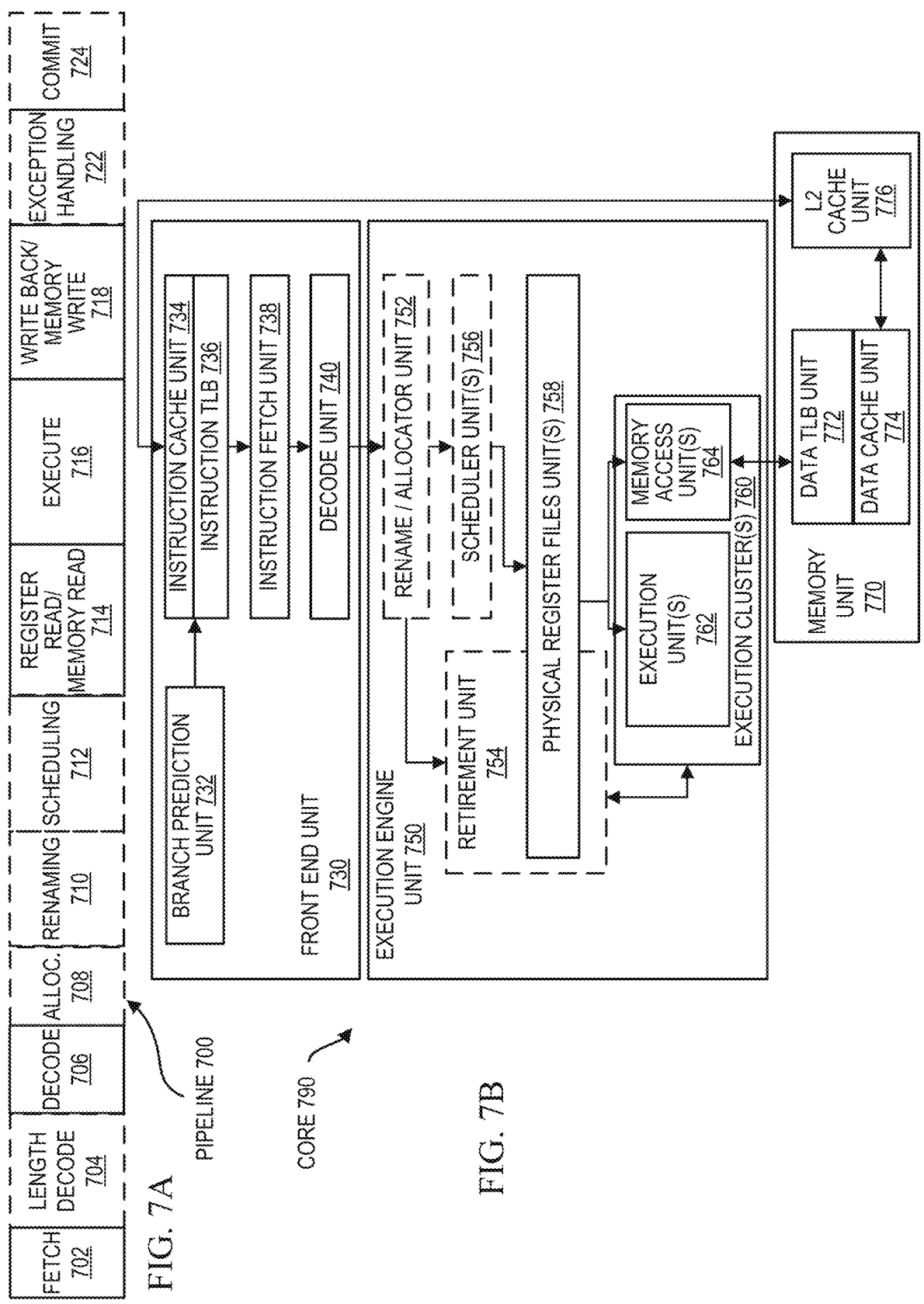
FIG. 7A is a block diagram illustrating both an exemplary in-order pipeline and an exemplary register renaming, out-of-order issue/execution pipeline in accordance with certain embodiments.
FIG. 7B is a block diagram illustrating both an exemplary embodiment of an in-order architecture core and an exemplary register renaming, out-of-order issue/execution architecture core to be included in a processor in accordance with certain embodiments.

FIG. 6 is an example illustration of a processor according to an embodiment. Processor 600 is an example of a type of hardware device that can be used in connection with the implementations shown and described herein (e.g., processor 102). Processor 600 may be any type of processor, such as a microprocessor, an embedded processor, a digital signal processor (DSP), a network processor, a multi-core processor, a single core processor, or other device to execute code. Although only one processor 600 is illustrated in FIG. 6, a processing element may alternatively include more than one of processor 600 illustrated in FIG. 6. Processor 600 may be a single-threaded core or, for at least one embodiment, the processor 600 may be multi-threaded in that it may include more than one hardware thread context (or "logical processor") per core.

FIG. 6 also illustrates a memory 602 coupled to processor 600 in accordance with an embodiment. Memory 602 is an example of a type of hardware device that can be used in connection with the implementations shown and described herein (e.g., memory 122). Memory 602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 600 can execute any type of instructions associated with algorithms, processes, or operations detailed herein. Generally, processor 600 can transform an element or an article (e.g., data) from one state or thing to another state or thing.

Code 604, which may be one or more instructions to be executed by processor 600, may be stored in memory 602, or may be stored in software, hardware, firmware, or any suitable combination thereof, or in any other internal or external component, device, element, or object where appropriate and based on particular needs. In one example, processor 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 also includes register renaming logic 610 and scheduling logic 612, which generally allocate resources and queue the operation corresponding to the instruction for execution.

Processor 600 can also include execution logic 614 having a set of execution units 616*a*, 616*b*, 616*n*, etc. Some embodiments may include a number of execution units dedicated to specific functions or sets of functions. Other embodiments may include only one execution unit or one execution unit that can perform a particular function. Execution logic 614 performs the operations specified by code instructions.

After completion of execution of the operations specified by the code instructions, back-end logic 618 can retire the instructions of code 604. In one embodiment, processor 600 allows out of order execution but requires in order retirement of instructions. Retirement logic 620 may take a variety of known forms (e.g., re-order buffers or the like). In this manner, processor 600 is transformed during execution of code 604, at least in terms of the output generated by the decoder, hardware registers and tables utilized by register renaming logic 610, and any registers (not shown) modified by execution logic 614.

Although not shown in FIG. 6, a processing element may include other elements on a chip with processor 600. For example, a processing element may include memory control logic along with processor 600. The processing element may include I/O control logic and/or may include I/O control logic integrated with memory control logic. The processing element may also include one or more caches. In some embodiments, non-volatile memory (such as flash memory or fuses) may also be included on the chip with processor 600.

FIG. 7A is a block diagram illustrating both an exemplary in-order pipeline and an exemplary register renaming, out-of-order issue/execution pipeline according to one or more embodiments of this disclosure. FIG. 7B is a block diagram illustrating both an exemplary embodiment of an in-order architecture core and an exemplary register renaming, out-of-order issue/execution architecture core to be included in a processor according to one or more embodiments of this disclosure. The solid lined boxes in FIG. 7A-7B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a schedule (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. Processor core 790 and memory unit 770 are examples of the types of hardware that can be used in connection with the implementations shown and described herein (e.g., processor 102, memory 122). The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like. In addition, processor core 790 and its components represent example architecture that could be used to implement logical processors and their respective components.

The front end unit 730 includes a branch prediction unit 732 coupled to an instruction cache unit 734, which is coupled to an instruction translation lookaside buffer (TLB) unit 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers (GPRs). In at least some embodiments described herein, register units 758 are examples of the types of hardware that can be used in connection with the implementations shown and described herein (e.g., registers 106). The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 762 may also include an address generation unit to calculate addresses used by the core to access main memory (e.g., memory unit 770) and a page miss handler (PMH).

The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory. In addition, a page miss handler (e.g., page miss handler 826) may also be included in core 790 to look up an address mapping in a page table if no match is found in the data TLB unit 772.

By way of example, the exemplary register renaming, out-of-order issue/execution core architecture may implement the pipeline 700 as follows: 1) the instruction fetch unit 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 8:
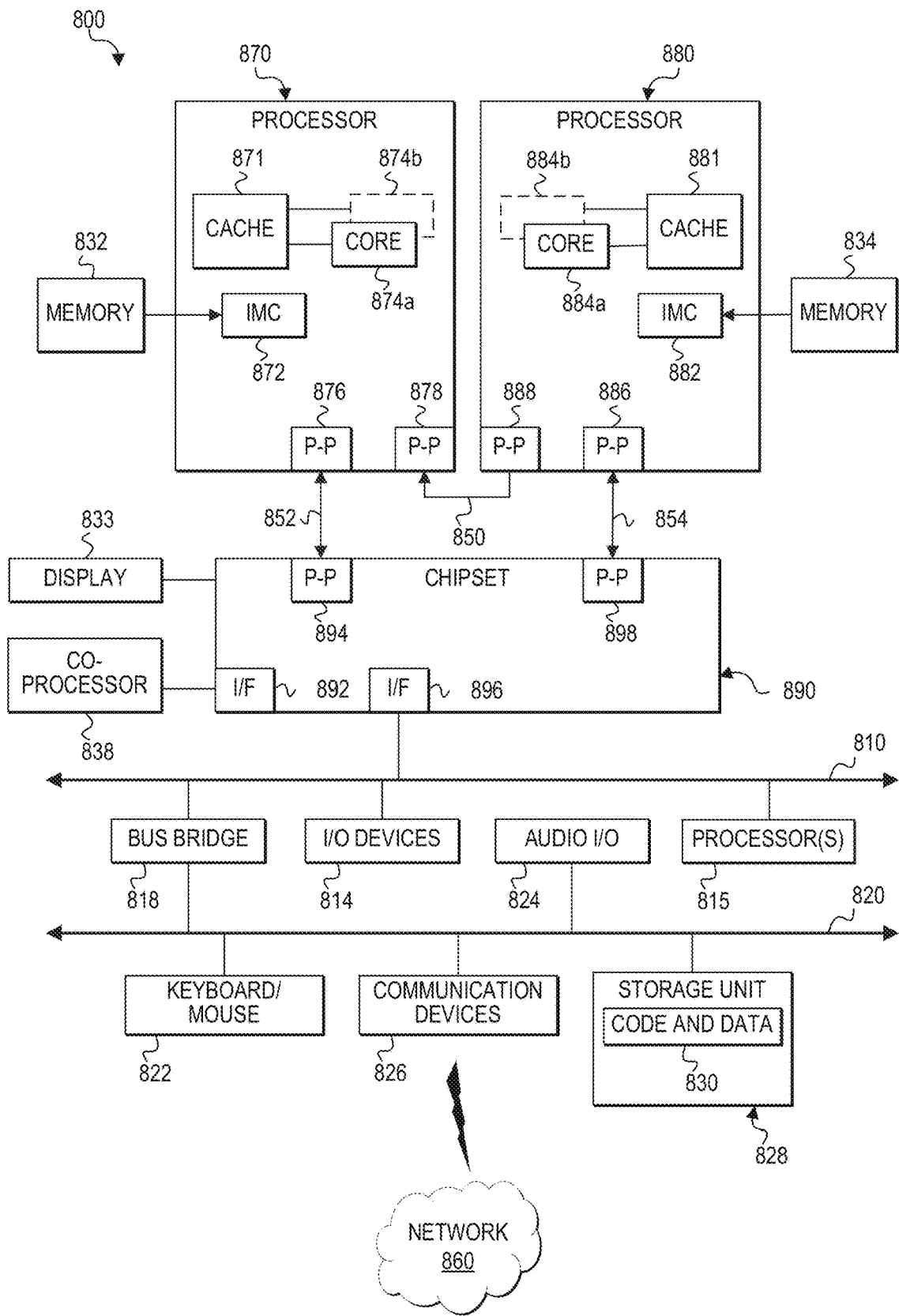
FIG. 8 is a block diagram of an example computer architecture according to at least one embodiment.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the computing systems or computing devices described (e.g., computing system 100) herein may be configured in the same or similar manner as computing system 800.

Processors 870 and 880 may be implemented as single core processors 874a and 884a or multi-core processors 874a-874b and 884a-884b. Processors 870 and 880 may each include a cache 871 and 881 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 800. Moreover, processors 870 and 880 are examples of the types of hardware that can be used in connection with the implementations shown and described herein (e.g., processor 102).

Processors 870 and 880 may also each include integrated memory controller logic (MC) 872 and 882 to communicate with memory elements 832 and 834, which may be portions of main memory locally attached to the respective processors. In alternative embodiments, memory controller logic 872 and 882 may be discrete logic separate from processors 870 and 880. Memory elements 832 and/or 834 may store various data to be used by processors 870 and 880 in achieving operations and functionality outlined herein.

Processors 870 and 880 may be any type of processor, such as those discussed in connection with other figures. Processors 870 and 880 may exchange data via a point-to-point (PtP) interface 850 using point-to-point interface circuits 878 and 888, respectively. Processors 870 and 880 may each exchange data with an input/output (I/O) subsystem 890 via individual point-to-point interfaces 852 and 854 using point-to-point interface circuits 876, 886, 894, and 898. I/O subsystem 890 may also exchange data with a high-performance graphics circuit 838 via a high-performance graphics interface 839, using an interface circuit 892, which could be a PtP interface circuit. In one embodiment, the high-performance graphics circuit 838 is a special-purpose processor, such as, for example, a high-throughput MIC processor, a network or communication processor, compression engine, graphics processor, GPGPU, embedded processor, or the like. I/O subsystem 890 may also communicate with a display 833 for displaying data that is viewable by a human user. In alternative embodiments, any or all of the PtP links illustrated in FIG. 8 could be implemented as a multi-drop bus rather than a PtP link.

I/O subsystem 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a user interface 812 (such as a keyboard, mouse, touchscreen, or other input devices), communication devices 826 (such as modems, network interface devices, or other types of communication devices that may communicate through a computer network 860), audio I/O devices 814, and/or a data storage device 828. Data storage device 828 may store code and data 830, which may be executed by processors 870 and/or 880. In alternative embodiments, any portions of the bus architectures could be implemented with one or more PtP links.

Program code, such as code 830, may be applied to input instructions to perform the functions described herein and generate output information. The output information may be applied to one or more output devices, in known fashion. For purposes of this application, a processing system may be part of computing system 800 and includes any system that has a processor, such as, for example, a digital signal processor (DSP), a microcontroller, an application specific integrated circuit (ASIC), or a microprocessor.

The program code (e.g., 830) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 9:
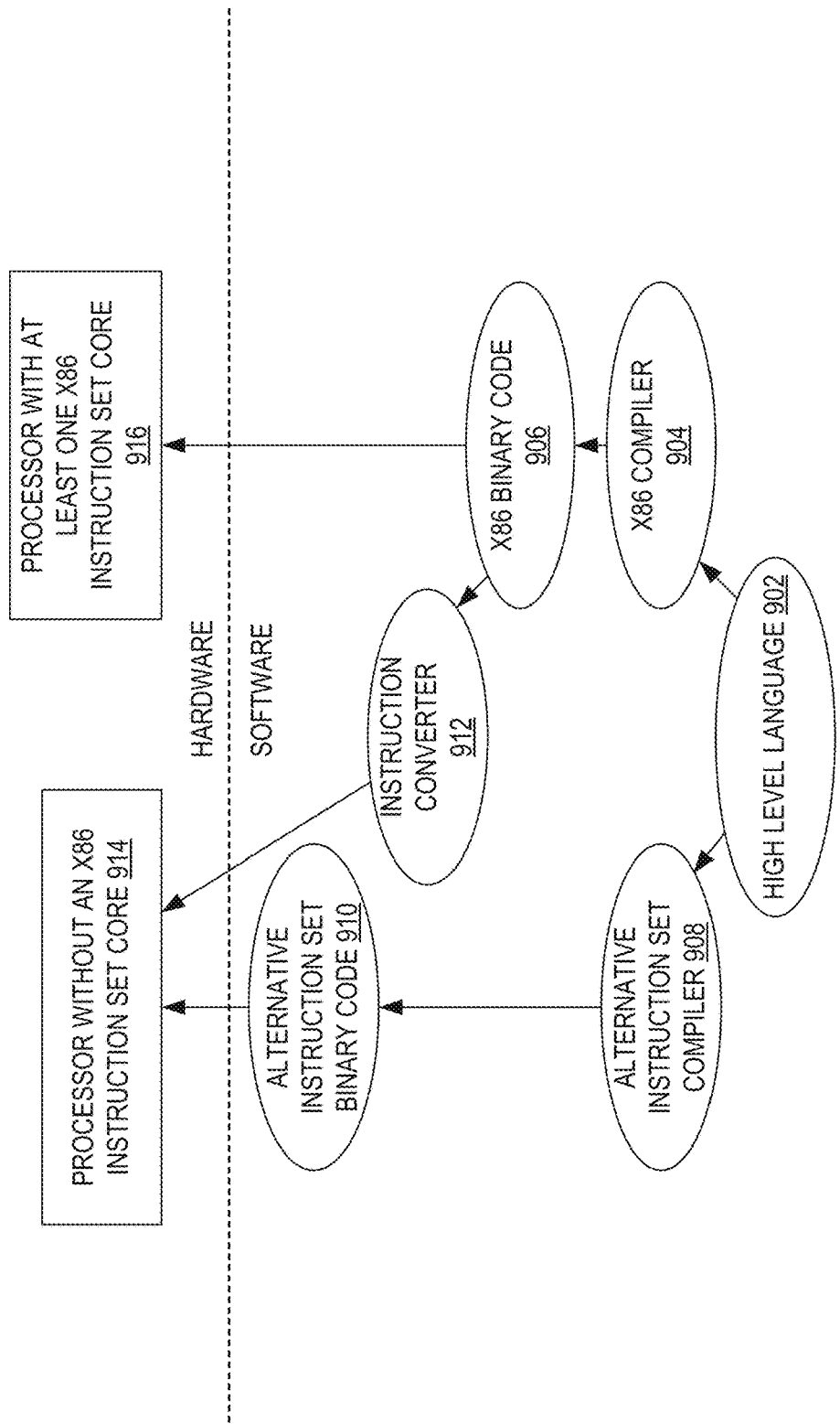
FIG. 9 is a block diagram contrasting the use of a software instruction converter to convert binary instructions in a source instruction set to binary instructions in a target instruction set according to embodiments of the present disclosure.

FIG. 9 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 9 shows a program in a high level language 902 may be compiled using an x86 compiler 904 to generate x86 binary code 906 that may be natively executed by a processor with at least one x86 instruction set core 916. The processor with at least one x86 instruction set core 916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 904 represents a compiler that is operable to generate x86 binary code 906 (e.g., object code) that can, with or without additional linkage processing, be executed on the processor with at least one x86 instruction set core 916. Similarly, FIG. 9 shows the program in the high level language 902 may be compiled using an alternative instruction set compiler 908 to generate alternative instruction set binary code 910 that may be natively executed by a processor without at least one x86 instruction set core 914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 912 is used to convert the x86 binary code 906 into code that may be natively executed by the processor without an x86 instruction set core 914. This converted code is not likely to be the same as the alternative instruction set binary code 910 because an instruction converter capable of this is difficult to make; however, the converted code will accomplish the general operation and be made up of instructions from the alternative instruction set. Thus, the instruction converter 912 represents software, firmware, hardware, or a combination thereof that, through emulation, simulation or any other process, allows a processor or other electronic device that does not have an x86 instruction set processor or core to execute the x86 binary code 906.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example 1 may comprise an apparatus comprising a processor comprising at least one core to execute instructions of a plurality of virtual machines and a virtual machine monitor; and a cryptographic engine comprising circuitry to protect data associated with the plurality of virtual machines through use of a plurality of private keys and an accessor key, wherein each of the plurality of private keys are to protect a respective virtual machine and the accessor key is to protect management structures of the plurality of virtual machines; and wherein the processor is to provide, to the virtual machine monitor, direct read access to the management structures of the plurality of virtual machines through the accessor key and indirect write access to the management structures of the plurality of virtual machines through a secure software module.

Example 2 may comprise the subject matter of example 1, wherein the management structures comprise page tables mapping guest physical addresses to physical addresses of a memory.

Example 3 may comprise the subject matter of any of examples 1-2, wherein the cryptographic engine is to provide, through the accessor key, integrity protection of the management structures of the plurality of virtual machines.

Example 4 may comprise the subject matter of any of examples 1-3, wherein the cryptographic engine is to encrypt, through the accessor key, the management structures of the plurality of virtual machines.

Example 5 may comprise the subject matter of any of examples 1-4, wherein the processor is to issue a page fault responsive to the virtual machine monitor attempting to write directly to the management structures of the plurality of virtual machines.

Example 6 may comprise the subject matter of any of examples 1-5, wherein the cryptographic engine is to return poisoned data responsive to the VMM attempting to access private data of a virtual machine using the accessor key.

Example 7 may comprise the subject matter of any of examples 1-6, wherein the cryptographic engine is to set a trust domain bit for writes using a private key of the plurality of private keys and to not set the trust domain bit for writes using the accessor key.

Example 8 may comprise the subject matter of any of examples 1-7, wherein the processor comprises a register to specify which key identifier of a key identifier space is an identifier of the accessor key.

Example 9 may comprise the subject matter of any one of examples 1-8, further comprising a memory to store encrypted program instructions and data of the plurality of virtual machines.

Example 10 may comprise the subject matter of any one of example 1-9, further comprising one or more of a battery communicatively coupled to the processor, a display communicatively coupled to the processor, or a network interface communicatively coupled to the processor.

Example 11 may comprise a method comprising executing instructions of a plurality of virtual machines and a virtual machine monitor; protecting data associated with the plurality of virtual machines through use of a plurality of private keys and an accessor key, wherein each of the plurality of private keys are to protect a respective virtual machine and the accessor key is to protect management structures of the plurality of virtual machines; and providing, to the virtual machine monitor, direct read access to the management structures of the plurality of virtual machines through the accessor key and indirect write access to the management structures of the plurality of virtual machines through a secure software module.

Example 12 may comprise the subject matter of example 11, wherein the management structures comprise page tables mapping guest physical addresses to physical addresses of a memory.

Example 13 may comprise the subject matter of any one of examples 11-12, further comprising providing, through the accessor key, integrity protection of the management structures of the plurality of virtual machines.

Example 14 may comprise the subject matter of any one of examples 11-13, further comprising encrypting, through the accessor key, the management structures of the plurality of virtual machines.

Example 15 may comprise the subject matter of any one of examples 11-14, further comprising issuing a page fault responsive to the virtual machine monitor attempting to write directly to the management structures of the plurality of virtual machines.

Example 16 may comprise the subject matter of any one of examples 11-15, further comprising returning poisoned data responsive to the VMM attempting to access private data of a virtual machine using the accessor key.

Example 17 may comprise the subject matter of any one of examples 11-16, setting a trust domain bit for writes using a private key of the plurality of private keys and not setting the trust domain bit for writes using the accessor key.

Example 18 may comprise the subject matter of any one of examples 11-17, further comprising storing in a register a value to specify which key identifier of a key identifier space is an identifier of the accessor key.

Example 19 includes one or more non-transitory computer-readable media with code stored thereon, wherein the code is executable to cause a machine to protect data associated with a plurality of virtual machines through use of a plurality of private keys and an accessor key, wherein each of the plurality of private keys are to protect a respective virtual machine and the accessor key is to protect management structures of the plurality of virtual machines; and provide, to a virtual machine monitor, direct read access to the management structures of the plurality of virtual machines through the accessor key and indirect write access to the management structures of the plurality of virtual machines through a secure software module.

Example 20 includes the subject matter of example 19, wherein the management structures comprise page tables mapping guest physical addresses to physical addresses of a memory.

Example 21 may comprise the subject matter of any one of examples 19-20, wherein the code is executable to cause a machine to provide, through the accessor key, integrity protection of the management structures of the plurality of virtual machines Example 22 may comprise the subject matter of any one of examples 19-21, wherein the code is executable to cause a machine to encrypt, through the accessor key, the management structures of the plurality of virtual machines.

Example 23 may comprise the subject matter of any one of examples 19-22, wherein the code is executable to cause the machine to issue a page fault responsive to the virtual machine monitor attempting to write directly to the management structures of the plurality of virtual machines Example 24 may comprise the subject matter of any one of examples 19-23, wherein the code is executable to cause the machine to return poisoned data responsive to the VMM attempting to access private data of a virtual machine using the accessor key.

Example 25 may comprise the subject matter of any one of examples 19-24, wherein the code is executable to cause the machine to set a trust domain bit for writes using a private key of the plurality of private keys and to not set the trust domain bit for writes using the accessor key.

Example 26 may comprise the subject matter of any one of examples 19-25, wherein the code is executable to cause the machine to store in a register a value to specify which key identifier of a key identifier space is an identifier of the accessor key.

What is claimed is:

1. An apparatus comprising:
a processor comprising:
at least one core to execute instructions of a plurality of virtual machines and a virtual machine monitor; and
a cryptographic engine comprising circuitry to protect data associated with the plurality of virtual machines through use of a plurality of private keys and an accessor key, wherein each of the plurality of private keys are to protect a respective virtual machine and the accessor key is to protect management structures of the plurality of virtual machines; and
wherein the processor is to provide, to the virtual machine monitor, direct read access to the management structures of the plurality of virtual machines through the accessor key and indirect write access to the management structures of the plurality of virtual machines through a secure software module.

2. The apparatus of claim 1, wherein the management structures comprise page tables mapping guest physical addresses to physical addresses of a memory.

3. The apparatus of claim 1, wherein the cryptographic engine is to provide, through the accessor key, integrity protection of the management structures of the plurality of virtual machines.

4. The apparatus of claim 1, wherein the cryptographic engine is to encrypt, through the accessor key, the management structures of the plurality of virtual machines.

5. The apparatus of claim 1, wherein the processor is to issue a page fault responsive to the virtual machine monitor attempting to write directly to the management structures of the plurality of virtual machines.

6. The apparatus of claim 1, wherein the cryptographic engine is to return poisoned data responsive to the virtual machine monitor attempting to access private data of a virtual machine using the accessor key.

7. The apparatus of claim 1, wherein the cryptographic engine is to set a trust domain bit for writes using a private key of the plurality of private keys and to not set the trust domain bit for writes using the accessor key.

8. The apparatus of claim 1, wherein the processor comprises a register to specify which key identifier of a key identifier space is an identifier of the accessor key.

9. The apparatus of claim 1, further comprising a memory to store encrypted program instructions and data of the plurality of virtual machines.

10. The apparatus of claim 1, further comprising one or more of a battery communicatively coupled to the processor, a display communicatively coupled to the processor, or a network interface communicatively coupled to the processor.

11. A method comprising:
executing instructions of a plurality of virtual machines and a virtual machine monitor;
protecting data associated with the plurality of virtual machines through use of a plurality of private keys and an accessor key, wherein each of the plurality of private keys are to protect a respective virtual machine and the accessor key is to protect management structures of the plurality of virtual machines; and
providing, to the virtual machine monitor, direct read access to the management structures of the plurality of virtual machines through the accessor key and indirect write access to the management structures of the plurality of virtual machines through a secure software module.

12. The method of claim 11, wherein the management structures comprise page tables mapping guest physical addresses to physical addresses of a memory.

13. The method of claim 11, further comprising providing, through the accessor key, integrity protection of the management structures of the plurality of virtual machines.

14. The method of claim 11, further comprising encrypting, through the accessor key, the management structures of the plurality of virtual machines.

15. The method of claim 11, further comprising issuing a page fault responsive to the virtual machine monitor attempting to write directly to the management structures of the plurality of virtual machines.

16. One or more non-transitory computer-readable media with code stored thereon, wherein the code is executable to cause a machine to:
   protect data associated with a plurality of virtual machines through use of a plurality of private keys and an accessor key, wherein each of the plurality of private keys are to protect a respective virtual machine and the accessor key is to protect management structures of the plurality of virtual machines; and
   provide, to a virtual machine monitor, direct read access to the management structures of the plurality of virtual machines through the accessor key and indirect write access to the management structures of the plurality of virtual machines through a secure software module.

17. The one or more computer-readable media of claim 16, wherein the management structures comprise page tables mapping guest physical addresses to physical addresses of a memory.

18. The one or more computer-readable media of claim 16, wherein the code is executable to cause a machine to provide, through the accessor key, integrity protection of the management structures of the plurality of virtual machines.

19. The one or more computer-readable media of claim 16, wherein the code is executable to cause a machine to encrypt, through the accessor key, the management structures of the plurality of virtual machines.

20. The one or more computer-readable media of claim 16, wherein the code is executable to cause the machine to issue a page fault responsive to the virtual machine monitor attempting to write directly to the management structures of the plurality of virtual machines.

* * * * *